United States Patent [19]
van Manen

[11] Patent Number: 5,967,010
[45] Date of Patent: Oct. 19, 1999

[54] CUTTING APPARATUS AND CUTTING PROCESS FOR HOLLOW PLASTIC MOLDED ARTICLES

[75] Inventor: Dick van Manen, Canandaigua, N.Y.

[73] Assignee: Cambridge Industries, Inc., Madison Heights, Mich.

[21] Appl. No.: 09/058,603

[22] Filed: Apr. 10, 1998

[51] Int. Cl.[6] .................................................. B26D 1/09
[52] U.S. Cl. .............................. 83/54; 83/188; 83/192; 83/946
[58] Field of Search ............................. 83/54, 155, 206, 83/318, 319, 320, 178, 188, 192, 914, 946

[56] References Cited

U.S. PATENT DOCUMENTS

| | | |
|---|---|---|
| 3,232,154 | 2/1966 | Kane . |
| 3,272,045 | 9/1966 | Cookson .................................. 83/320 |
| 3,292,473 | 12/1966 | Couzens et al. ......................... 83/318 |
| 3,304,819 | 2/1967 | Pasternack .............................. 83/319 |
| 3,319,498 | 5/1967 | Wolford . |
| 3,464,084 | 9/1969 | Thompson . |
| 3,464,931 | 9/1969 | Rupert . |
| 3,541,928 | 2/1972 | Levy ...................................... 83/320 |
| 3,566,728 | 3/1971 | Ohmasu .................................. 83/319 |
| 3,581,691 | 6/1971 | Ringler . |
| 3,583,294 | 6/1971 | Lense ..................................... 83/318 |
| 3,610,492 | 10/1971 | Bourgeois . |
| 3,677,454 | 7/1972 | Boyer . |
| 3,808,928 | 5/1974 | Plegat ..................................... 83/318 |
| 3,811,354 | 5/1974 | Ito ......................................... 83/320 |
| 3,924,502 | 12/1975 | Borzym ................................... 83/319 |
| 3,945,284 | 3/1976 | Wetzels et al. .......................... 83/318 |
| 4,198,886 | 4/1980 | Bowers et al. . |
| 4,351,459 | 9/1982 | Huey-Min ................................ 83/407 |
| 4,411,182 | 10/1983 | Borzym ................................... 83/319 |
| 4,457,200 | 7/1984 | Borzym ................................... 83/319 |
| 4,490,081 | 12/1984 | Kuchuk-Yatsenko et al. . |
| 4,744,276 | 5/1988 | Duce ....................................... 83/50 |
| 4,876,930 | 10/1989 | Thatcher . |
| 4,982,635 | 1/1991 | Van Manen . |
| 5,063,801 | 11/1991 | Wallis ..................................... 83/320 |
| 5,088,364 | 2/1992 | Stolzer ................................... 83/206 |
| 5,406,870 | 4/1995 | Suitts et al. ............................ 83/54 |
| 5,603,249 | 2/1997 | Weber et al. . |

*Primary Examiner*—Kenneth E. Peterson
*Assistant Examiner*—Gyounghyun Bae
*Attorney, Agent, or Firm*—Reising, Ethington, Barnes, Kisselle, Learman & McCulloch

[57] ABSTRACT

A process for cutting hollow molded plastic parts uses two knife cuttings in sequence. A first knife blade (42) is pressed on an uncut hollow molded plastic part for cutting therethrough with a guillotine blade action to form an access hole (46, 48) in the plastic part (10). The plastic part (10) may be secured onto a clamp (34, 36) for the first guillotine blade action. An outer support clamp (50, 52) is then secured about the plastic part with an outer side of the support clamp being positioned in proximity to the finished cut edge (65) of a finished plastic part. A mandrel (54) is inserted into the access hole (46, 48) of the part. The inner end of the mandrel is axially spaced from the outer side of the support clamp to allow a thin knife blade therebetween. A thin knife blade (62, 64) then cuts off the rough edge (47) to provide a finished cut edge (65) in the plastic part axially interposed between the outer side of the support clamp and the inner mandrel.

8 Claims, 3 Drawing Sheets

CUTTING APPARATUS AND CUTTING PROCESS FOR HOLLOW PLASTIC MOLDED ARTICLES

TECHNICAL FIELD

The field of this invention relates to a process for cutting blow molded or rotationally molded articles to form clean squared edges.

BACKGROUND OF THE DISCLOSURE

Plastic parts have seen many applications and continue to replace other materials as the material properties and the processes for manufacturing improve. One problem in manufacturing plastic parts, particularly for blow molded or rotationally molded parts is the cutting process into the final shape. A blow or rotationally molded part is only semi rigid. When pressure from a knife or blade is exerted onto the outside of a hollow blow molded or rotationally molded part, the knife or blade permanently deforms the part to such an extent that the part no longer is within manufacturing tolerances. The manufacturing tolerances may vary with different applications but can be relatively small. For example, duct components made for air movement in specialized machines such as paper copiers may have relatively small manufacturing tolerances.

In order to maintain the part within acceptable tolerances of deformation, other methods of cutting have been developed. One such method is with saw cutting. Saw cutting is a relatively slow process and it creates large quantities of plastic dust. Effort and expense must be spent to control and properly dispose of the plastic dust. Another method is a water jet cutting. Water jet cutting may reduce the plastic dust but only with the inconvenience of a watery mess that also needs to be controlled. Another method is with the use of a laser cutter. The use of a laser literally melts the plastic and burns through the plastic. Great care is needed to prevent discoloration due to charring of the plastic. Furthermore, it is very difficult to maintain a square edge during the laser cutting process due to the melting of the plastic.

What is needed is a economical cutting process that reduces deformation of a plastic part and provides a square edge to the finished part.

SUMMARY OF THE DISCLOSURE

In accordance with one aspect of the invention, a process for cutting hollow molded plastic parts uses two knife cuttings in sequence. A first knife blade is pressed on an uncut hollow molded plastic part for cutting therethrough with a guillotine blade action to form an access hole in the plastic part. The plastic part may be secured onto a clamp for the first guillotine blade action. An outer support clamp is then secured about the plastic part with an outer side of the said support clamp being positioned in proximity to the finished cut edge of a finished plastic part. A mandrel is inserted into the access hole of the part. The inner end of the mandrel is axially spaced from the outer side of the support clamp to allow a thin knife blade therebetween. A thin knife blade then provides a finished cut edge into said plastic part axially interposed between the outer side of the support clamp and the inner mandrel. The mandrel and support clamp provide axial support to the knife blade as it cuts into the plastic. The mandrel also provides support to the plastic against excessive inward deformation. The outer support clamp also provides support to the plastic against excessive outward deformation.

It is preferable that the unfinished plastic part is generally elongated. The access hole is formed when an end is cut off the elongated unfinished part. The finished edge is formed by cutting the formed edge off from about the access hole.

It is desirable that the elongated part has two opposite holes simultaneously formed with respective first and second access holes. The opposite access holes are formed when respective opposite ends are cut off of the elongated unfinished part. The finished tubular part is formed with a passage therethrough by simultaneously cutting an edge off about each access hole with a respective retractable mandrel inside each access hole.

In accordance with another aspect of the invention, a cutting apparatus cuts hollow molded plastic parts into finished parts. The apparatus includes a clamp for securing a hollow molded plastic part securely against undesirable movement. A first knife blade is movably mounted with respect to the clamp for cutting through an uncut hollow molded plastic part with a guillotine blade action to form an access hole in said plastic part while said plastic part is secured onto said clamp. An outer support clamp secures the plastic part with an outer side of the support clamp being positioned in proximity to the position of the finished cut edge of a finished plastic part. A movable mandrel is movably mounted for insertion into the access hole such that the inner end of the mandrel is axially spaced from the outer side of the support clamp by the thickness of a thin knife blade. The thin knife blade is movably mounted with respect to the mandrel and outer support clamp for cutting a finished cut edge into the plastic part between the outer side of the support clamp and the inner mandrel.

Preferably, the first clamp extends completely about the uncut hollow molded plastic part before cutting into the uncut hollow molded plastic part and the outer support clamp also extends completely around said hollow molded plastic part.

It is desirable that the thin knife blade is substantially thinner than said first knife blade.

BRIEF DESCRIPTION OF THE DRAWINGS

Reference now is made to the accompanying drawings in which.

DETAILED DESCRIPTION OF THE PREFERRED EMBODIMENT

Figure 1:
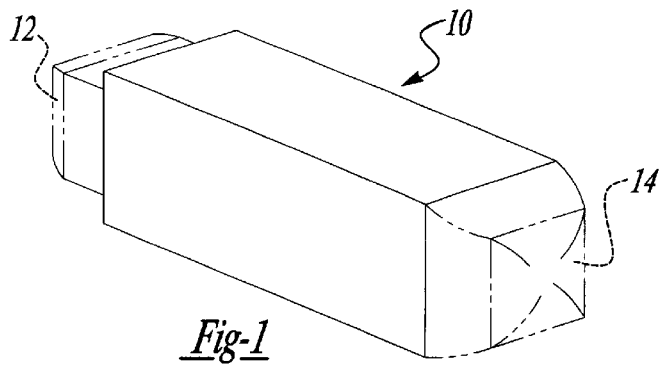
FIG. 1 is a perspective view of an uncut blow molded plastic article before cutting to final shape.
Figure 2:
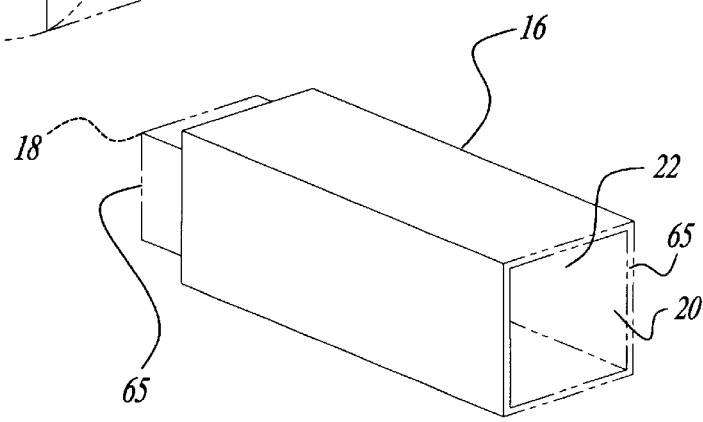
FIG. 2 is view similar to FIG. 1 of a blow molded plastic article after final cutting.

Referring now to FIG. 1, an elongated hollow blow molded article 10 has two closed ends 12 and 14 that need to be cut off to form the finished cut article 16 with open ends 18 and 20 shown in FIG. 2. The article 16 is a duct or tubular member with a passage 22 formed between the two open ends 18 and 20.

Figure 3:
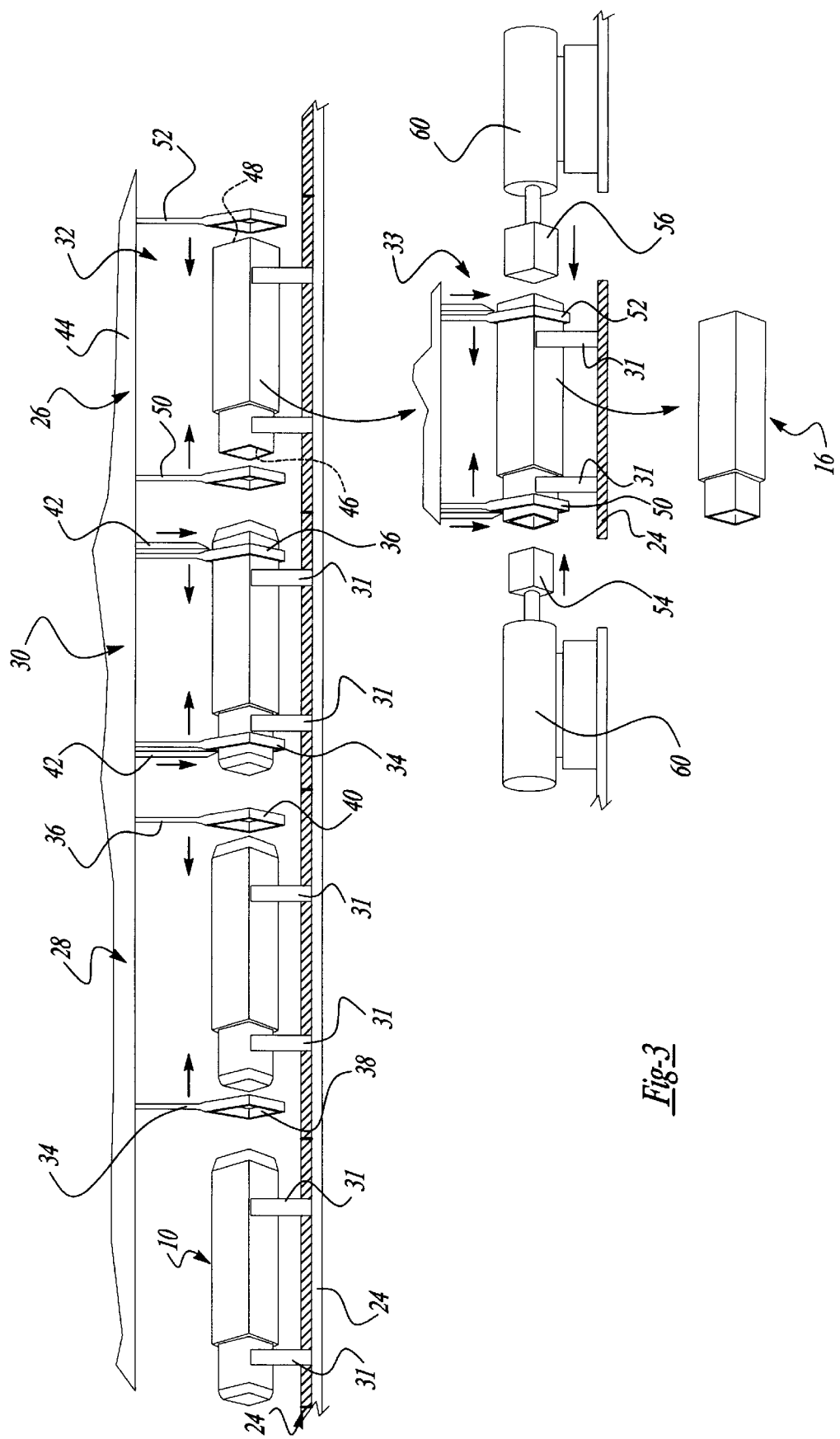
FIG. 3 is a schematic view of a cutting apparatus that include several work stations.

Referring now to FIG. 3, the transformation from the unfinished article 10 to the cut finished article is accomplished by placement of the article 10 on a conveyor 24 in an automated apparatus 26 shown in FIG. 3. The apparatus 26 includes a plurality of work stations 28, 30, 32 and 33 that cut off the closed ends 12 and 14.

Figure 4:
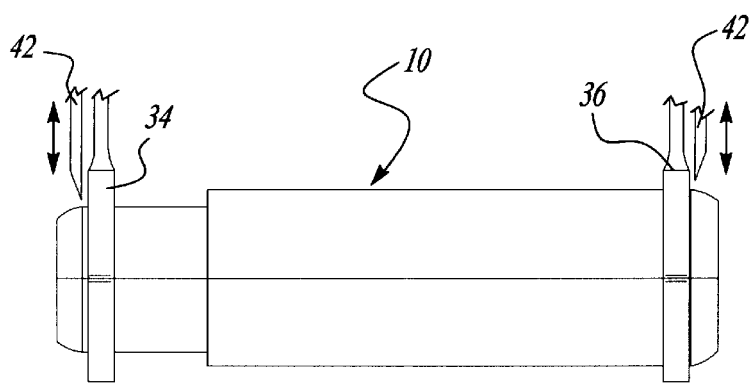
FIG. 4 is a side elevational view of the blow molded plastic article undergoing a rough cut at one of the work stations 30 shown in FIG. 3.
Figure 5:
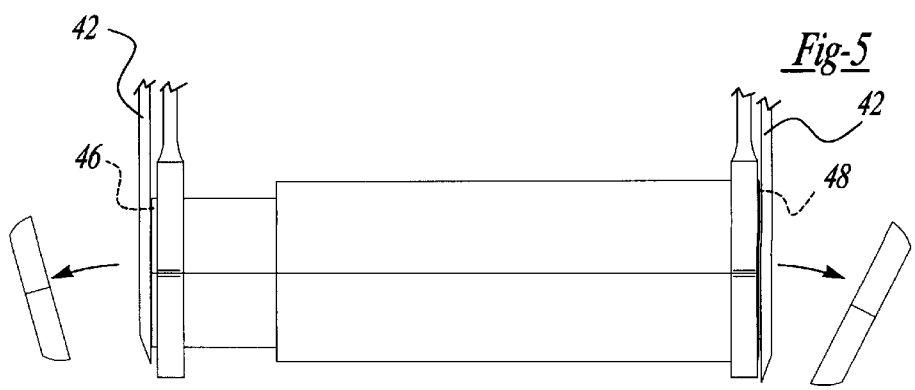
FIG. 5 is a side elevational view similar to FIG. 4 after the rough cut has been performed.

The conveyor 24 has raised stands 31 that hold the article 10 thereon as it moves to the various work stations to expedite handling and lifting of the article 10. The first work station 28 has two support clamps 34 and 36 that are slipped over the respective closed ends 12 and 14 such that the closed ends 12 and 14 extend outward from the outer side 38 and 40 of respective support clamps 34 and 36. The clamps 34 and 36 travel to work station 30 where the two knife blades 42 are lowered to cut off each respective closed end 12 and 14 as more clearly shown in FIGS. 4 and 5. The support clamps 34 and 36 then disengage from the article 10 and shuttle back to work station 28 to engage another article 10. The above described motion of the clamps and blades are determined by various commercially available drive mechanisms (not shown) housed in upper casing 44 of the apparatus. While it is shown that the blades move downward, the same effect can be achieved by the clamps moving upward to move the article into and against stationary blades. Other arrangements can also be foreseen where one has on overhead conveyor and the blades come up to engage the plastic article 10. The important aspect is that the blades 42 and plastic article 10 move with respect to each other in order to produce a cutting action of the knife blades into the article 10 to form two open access holes 46 and 48 each with a rough edge 47.

Figure 6:
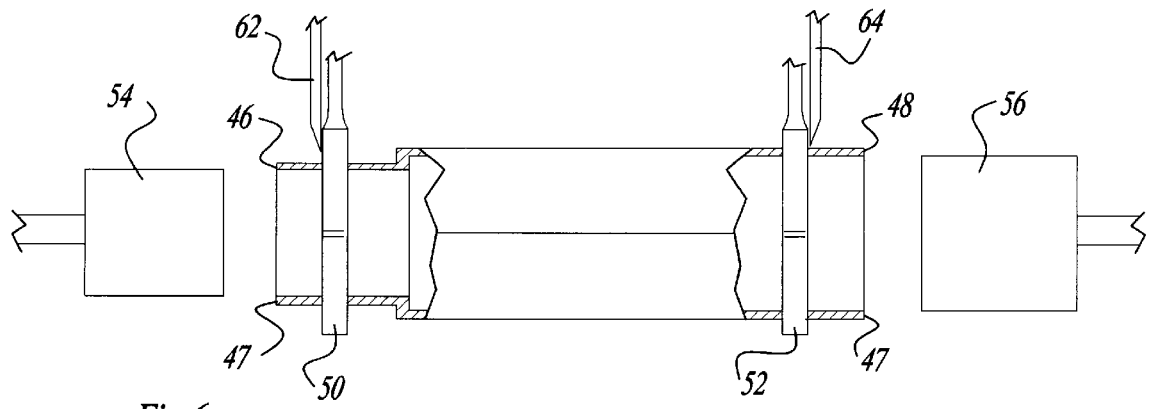
FIG. 6 is a side elevational view of the blow molded plastic article secured to a second set of clamps at another one of the work stations 33 shown in FIG. 3.
Figure 7:
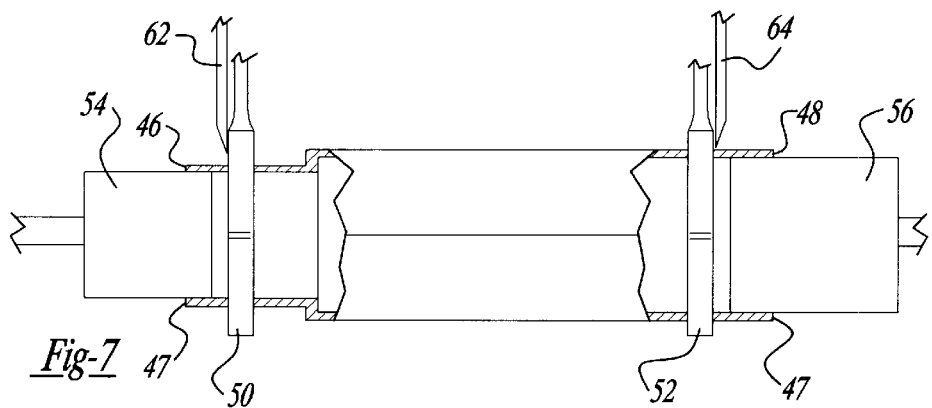
FIG. 7 is a view similar to FIG. 6 with the mandrels moved to engage the blow molded plastic article and the blades positioned for the final cut.

The article 10 is then carried to work station 32 where a second pair of clamps 50 and 52 engages the exterior of article 10 also spaced from the rough edge 47. The clamps then move the work station 33 as more clearly shown in FIG. 6 that show mandrels 54 and 56 disengaged from the article 10. As shown in FIG. 7, the mandrels 54 and 56 are driven by pistons and cylinder assemblies 60 to laterally extend into the two access holes 46 and 48. Each mandrel 54 and 56 is appropriately sized to provide a close fit within the respective aperture 46 and 48.

Each mandrel has its inner face 58 when fully inserted in the apertures 46 and 48 spaced from the outside edge of each clamp 50 and 52 to form a defined gap 59.

Figure 8:
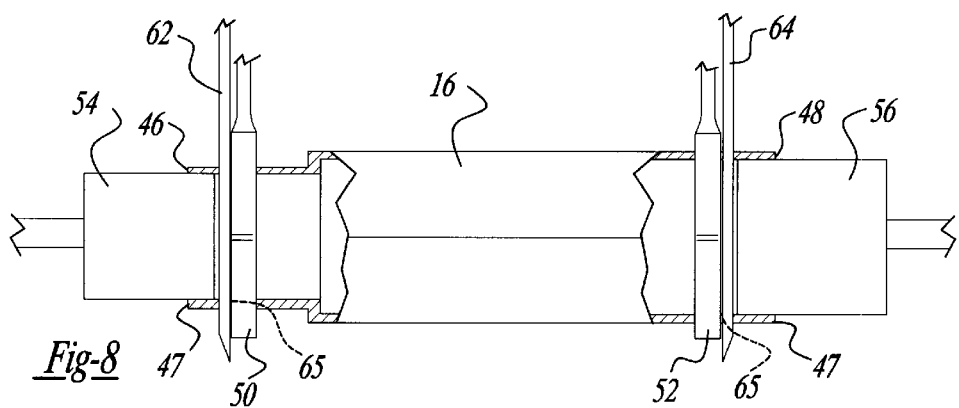
FIG. 8 is view similar to FIG. 7 after the final cut has been performed.

Two thin knives or blades 62 and 64 then extend down as shown in FIGS. 7 and 8 to cut off the rough edge 47 of each access hole 46 and 48. The thin blades 62 and 64 within gap 59. As the blades extend through the article, a respective blade is supported against lateral buckling by a respective inner face 58 and a respective clamp 50 or 52. As such, the gap 59 between the inner face 58 and clamp 50 or 52 is just wide enough to slidably receive the respective blades 62 and 64.

Furthermore, the article 10 is supported against collapse by the use of mandrels 54 and 56 within the openings 46 and 48. The article 10 is prevented from outward motion against the blade by the brackets 50 and 52 surrounding the article about its exterior. When the blade completely cuts through the article as shown in FIG. 8, the finished cut article 16 is formed as shown in FIG. 2 with openings 18 and 20 with clean square edges 65.

While article 10 is shown to be rectangular is cross section and mandrels 54 and 56 along with clamps 38, 40, 50, and 52 are shown also to be rectangular in shape, many other shapes are suitable. The clamps 34, 36, 50 and 52 just need to be complementarily conforming to slidably fit over each end of the article 10 and each mandrel needs to conform its shape to slidably fit snugly within openings 46 and 48. It is easily foreseen, that circular, polygonal and other more complex shaped articles may also be used with the presently described process of cutting.

It is also foreseen that this process can be used for articles with single openings and not limited to ducts or tubular articles.

In this fashion, a finished article with an open end is expeditiously formed with clean square edges about its opening from a blow molded article and a two step cutting process.

Other variations and modifications are possible without departing from the scope and spirit of the present invention as defined by the appended claims.

The embodiments in which an exclusive property or privilege is claimed are defined as follows:

1. A process for cutting hollow molded plastic parts, the process characterized by:

pressing a first knife blade for cutting through an uncut hollow molded plastic part with a guillotine blade action to form an access hole in said plastic part while said plastic part is secured onto a clamp;

securing an outer support clamp about said plastic part with an outer side of the said support clamp being positioned about the position of the finished cut edge of a finished plastic part;

positioning a mandrel with an inwardly facing face into said access hole and securing said cut plastic part with an inner end of the mandrel axially spaced from the outer side of the support clamp the thickness of a thin knife blade;

cutting a finished cut edge into said plastic part with a thin knife blade axially interposed between the outer side of the support clamp and the face of the mandrel with the face of the mandrel and support clamp providing axial support to the knife blade as it cuts into the plastic and with the mandrel also providing support to the plastic against excessive inward deformation and the outer support clamp also providing support to the plastic against excessive outward deformation.

2. A process as defined in claim 1 further characterized by:

providing a support clamp about the uncut hollow molded plastic part before cutting into the uncut hollow molded plastic part.

3. A process as defined in claim 2 further characterized by:

said unfinished plastic part being generally elongated and said access hole formed by cutting an end off of said elongated unfinished part;

said finished edge being formed by cutting off a rough edge about said access hole.

4. A process as defined in claim 2 further characterized by:

said unfinished plastic part being a generally elongated part having a respective first and second access hole formed by cutting a respective opposite end off of said elongated unfinished part;

a finished tubular part with a passage therethrough being formed by cutting off an edge about each access hole with a respective retractable mandrel inside said access hole.

5. A cutting apparatus for hollow molded plastic parts, said apparatus characterized by:

a clamp for securing a hollow molded plastic part securely against undesirable movement;

a first knife blade movable with respect to said clamp for cutting through an uncut hollow molded plastic part with a guillotine blade action to form an access hole in said plastic part while said plastic part is secured onto said clamp;

an outer support clamp for securing said plastic part with an outer side of the said support clamp being positioned about the position of the finished cut edge of a finished plastic part;

a movable mandrel for insertion into said access hole such that the inner face of the mandrel is axially spaced from the outer side of the support clamp by the thickness of a thin knife blade;

a thin knife blade movable mounted with respect to the mandrel and outer support clamp for cutting a finished cut edge into said plastic part between the outer side of the support clamp and the inner mandrel with the mandrel and support clamp providing axial support to the knife blade as it cuts into the plastic and with the mandrel also providing support to the plastic against excessive inward deformation and the outer support clamp also providing support to the plastic against excessive outward deformation.

6. An apparatus as defined in claim 5 further characterized by:

said first clamp extends completely about the uncut hollow molded plastic part before cutting into the uncut hollow molded plastic part.

7. An apparatus as defined in claim 6 further characterized by:

said outer support clamp extends completely around said hollow molded plastic part.

8. An apparatus as defined in claim 7 further characterized by:

said thin knife blade being substantially thinner than said first knife blade.

* * * * *